Dec. 26, 1950          F. OTT          2,535,227
APPARATUS FOR GENERATING ACETYLENE GAS
Filed Dec. 16, 1949
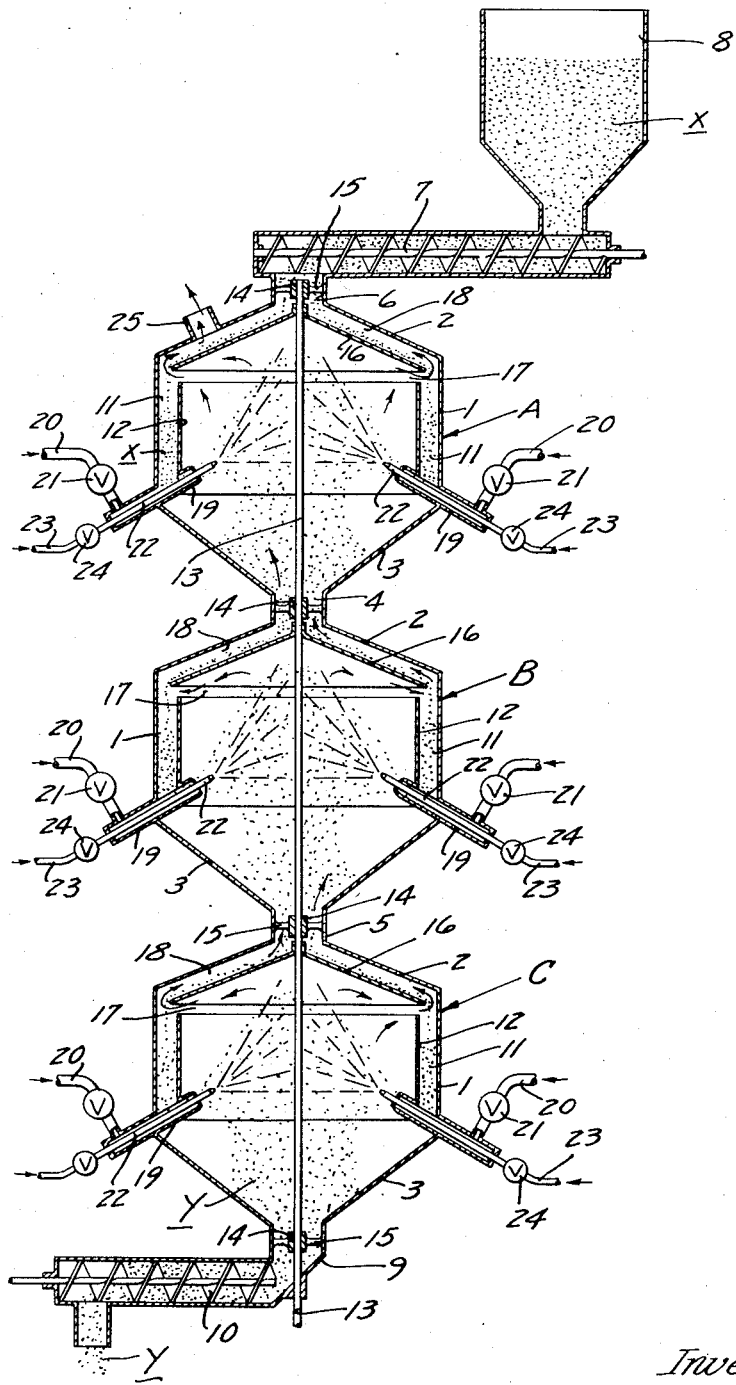
Inventor
Friedrich Ott
By his Attorneys
Merchant & Merchant Patented Dec. 26, 1950

2,535,227

UNITED STATES PATENT OFFICE 2,535,227

APPARATUS FOR GENERATING ACETYLENE GAS

Friedrich Ott, Frankfort-on-the-Main, Germany, assignor of fifty per cent interest to Paul E. Quintus, Arlington, Va.

Application December 16, 1949, Serial No. 133,346

8 Claims. (Cl. 48—38)

My invention relates to the art of generating acetylene gas from calcium carbide and is in the nature of the novel method of and apparatus therefor.

Numerous methods and structures for the production of acetylene gas have heretofore been developed. However, to my knowledge, none of these structures or methods are completely efficient in that they fail to completely utilize the carbide and likewise fail to produce as a by-product a relatively dry and pure hydrate of lime.

The primary object of my invention is the provision of a method and apparatus for the production of acetylene gas from calcium carbide, whereby the calcium carbide is completely and efficiently utilized and substantially dry pure hydrate of lime is produced as a by-product. This is accomplished by novel apparatus wherein pulverized hydrate of lime is successively subjected to atomized $H_2O$ while said carbide is held in a suspended state in a closed container, said carbide and the resulting hydrate of lime, formed as a result of the union between said carbide and said $H_2O$, being separated from each other between each successive step.

A further object of my invention is the provision of specifically novel apparatus, whereby a plurality of separate gasification casings are arranged in vertical relationship, and wherein the pulverized carbide and hydrate of lime are fed by gravity from one casing to another, each of said casings being provided with a rotary impact or raker plate which separates the hydrate of lime coating from each carbide particle.

The above and still further objects of my invention will become apparent from the following detailed specification, appended claims, and attached drawing.

Referring to the drawing, the single view is a diagrammatic vertical section through my novel apparatus.

My novel apparatus includes a plurality of vertically axially-aligned generally cylindrical gasification casings A, B, and C, each comprising a generally cylindrical side wall 1, a top wall 2, and a hopper-like bottom 3. The casings A and B are connected by a restricted central passage 4 while the casings B and C are connected by a similar passage 5 axially aligned with the passage 4. The casing A is provided with an inlet passage 6 in the upper wall thereof axially aligned with the passages 4 and 5. A screw conveyor 7 connected the inlet passage 6 with a storage bin or hopper 8 in which a supply of pulverized calcium carbide $x$ is maintained. The conveyor 7 may be rotated at the correct feeding speed by any suitable means not shown.

At its lowermost central portion, the hopper-like bottom 3 of the casing C is provided with an outlet 9 which feeds hydrate of lime $y$, formed from the carbide, to a screw conveyor 10. The conveyor 10 delivers the hydrate of lime to suitable means of disposal not shown.

The cylindrical walls 1 of the several casings A, B, and C form the outer walls of annular open-topped chambers 11 having cylindrical inner walls 12, the upper edges of which terminate in spaced relation to the top walls 2 of the several casings.

A shaft 13 extends axially through the several gasification casings A, B, and C, and is journalled for rotation in bearings 14 carried by radial arms or spiders 15 in the connecting passages 4 and 5 and in the inlet and outlet passages 6 and 9 respectively. A plurality of impact or raker plates 16 are rigidly secured to the shaft 13, one each within each of the casings A, B, and C, in downwardly-spaced relationship to the top walls 2 thereof. It will be noted that the peripheral edge portion of each raker plate 16 overlies the adjacent annular chamber 11 and is upwardly spaced from the upper edge of the inner wall 12 of the chamber 11, whereby to provide an annular gas passage 17. As shown, the top walls 2 of the several casings and the rotary raker plates 16 are generally conical and the space between each raker plate 16 and its adjacent casing top wall 2 provides a passage 18 for downward movement of pulverizing material and upward movement of generated gas. The shaft 13 with its raker plates 16, as well as the screw conveyor 10, may be rotated at a pre-determined speed by suitable means not shown.

A plurality, as shown two, of air injector nozzles 19 project angularly radially inwardly and upwardly to the interior of each casing A, B, and C, and terminate inwardly of each wall 12 of the chambers 11. Each injector nozzle 19 communicates with the bottom portion of its cooperating chamber 11 to receive material therefrom. Air under pressure is fed to each injector nozzle 19 from a supply source not shown through conduit means 20 in which is interposed a suitable valve 21. Coaxial with each air injector nozzle 19 is a water injector nozzle 22. Preferably and as shown, the water injector nozzles 22 project inwardly a short distance from the inner end of the air injector nozzles 19. The water injector nozzles 22 are each connected with a source of water or steam under pressure, not shown, by means of a conduit 23, and are each provided with a control valve 24. The injector nozzles 22 are arranged to deliver steam or finely divided or atomized water to the interior of the gasification casings.

The operation of my novel apparatus in the generation of acetylene gas is as follows: The shaft 13 and the raker plates 16 carried thereby are caused to rotate continuously, together with the conveyors 7 and 10. The conveyor 7 delivers pulverized carbide $x$ to the inlet 6 of the casing A through which the carbide is deposited upon the raker plate 16 therein. The several air valves 21 and the valves 24 of the water injector nozzles are opened to permit predetermined quantities of air and steam or water in a finely divided or atomized form to be injected into the interiors of the several gasification casings A, B, and C. As the pulverized carbide $x$ falls upon the raker plate 16 in the casing A, it is moved generally radially outwardly thereby, under the combined action of gravity and centrifugal force, and deposited in the annular chamber 11 of the casing A. From the annular chamber 11, the carbide particles $x$ are carried by the stream of air emanating from the air injector nozzles 19 to the interior of the casing A where it is united with the atomized water from the water injector nozzles 22 to form acetylene gas. The gas travels radially outwardly through the annular passage 17 between the raker plate 16 and the top of the inner wall 12 through the descending stream of carbide particles $x$. As the gas travels through the stream of carbide particles descending from the raker plate 16, any excess moisture in the generated gas is absorbed by the stream of carbide particles $x$, and a relatively dry acetylene gas is drawn out of the casing A through a gas outlet 25 to suitable disposal means therefor, not shown. As the carbide particles $x$ are united with the moisture from the nozzles 22, a coating of hydrate of lime is formed on each particle resulting from the generation of acetylene gas. These coated particles fall to the hopper-like bottom 3 of the casing A from whence they descend onto the rotary raker plate 16 of the casing B through the connecting passage 4. The impact of the coated particles $x$, as each thereof falls upon the raker plate 16 in the casing B, together with the scrubbing action applied thereto by the rotary raker plate, as the particles advance radially outwardly in the passage 18, separate the hydrate of lime coating from the particles $x$. The resultant mixture of scrubbed particles $x$ and finely-divided hydrate of lime falls into the annular chamber 11 in the casing B from whence they are injected to the central portion of the chamber B by the air injector nozzles 19 thereof and mixed with atomized streams of water or steam injected by the nozzles 22. The acetylene gas generated by the union of the moisture with the particles of carbide in the casing B travels radially outwardly through the annular passage 17 thereof, radially inwardly and upwardly through the passages 18 and 4, upwardly through the central portion of the casing A, through the annular passages 17 and 18 thereof, and the outlet 25. During its travel through the passage 18 in the casing B, the passage 4, and the interior of the casing A, the gas absorbs substantially all of the moisture remaining on the coated particles $x$ descending through the passage 4. When the injected particles of carbide and hydrate of lime have been subjected to the action of moisture in the casing B, the particles of hydrate of lime and the hydrate of lime-coated particles of carbide drop to the hopper-like bottom 3 of the casing B and from thence through the passage 5 onto the raker plate 16 in the casing C where the process above-described is repeated. The scrubbing of the particles of carbide by the raker plate 16 in the casing C removes the new hydrate of lime coating therefrom, the resulting particles of carbide being of a sufficiently small size to be completely changed into acetylene gas and hydrate of lime under the subsequent application of moisture. In the last stage of gas generation occurring in the casing C, I have found that the injection of steam through the nozzles 22 thereof is preferable to that of an atomized injection of water. The generated acetylene gas travels upwardly through the passages 5 and 4 and commingles with the gas generated in the casings B and A. The residual particles in the casing C comprise relatively pure hydrate of lime $y$ in a relatively dry state. The hydrate of lime $y$ falls to the hopper-like bottom 3 of the casing C from whence it is removed through the outlet passage 9 and the conveyor 10. It is important to note that the quantity of air and water injected to the interiors of the several casings A, B, and C may be accurately controlled by means of the several valves 21 and 24 so that the acetylene generated in the apparatus is of maximum concentration and the residual hydrate of lime is sufficiently dry to permit its being easily handled and to prevent its becoming adhered to the hopper bottom 3 of the casing C.

With the apparatus described above, I have overcome several objectionable features commonly found in the manufacture of acetylene gas from calcium carbide, to wit, the prevention of too great an absorption of water by the developed hydrate of lime and the prevention of large lumps of material formed during the process. It should also be noted that, by the method and apparatus disclosed above, I have been able to control the heat of chemical reaction within the casings A, B, and C, and avoid undesired overheating of the generated acetylene gas in any stage thereof.

While I have shown a preferred apparatus and method for generating acetylene gas from pulverized calcium carbide, it will be understood that the apparatus and method may be modified without departure from the scope and spirit of the invention as defined in the claims.

What I claim is:

1. In a device of the class described, a casing having inlet and outlet openings in its upper and lower ends respectively, an annular carbide-receiving chamber concentrically disposed within said casing, a raker plate mounted for rotation in said casing below said opening and adapted to receive carbide entering said inlet opening and deposit same in said annular receiving chamber, said raker plate and the inner wall of said annular chamber being vertically spaced to provide a gas passage therebetween, an air injector nozzle in the lower portion of said casing, said nozzle communicating with the lower end of said annular chamber and adapted to pick up carbide therefrom and project same upwardly into said casing toward the axis thereof, a fluid injector nozzle in said casing adapted to project a spray of atomized fluid into said casing in the general direction of the carbide, and means in the upper portion of said casing for removing therefrom gas generated by the union of said carbide and said fluid.

2. The structure defined in claim 1 in which the side walls of said casing are cylindrical and the inlet and outlet openings are in vertical axial alignment.

3. The structure defined in claim 1 in which the inlet and outlet openings in said casing are in vertical axial alignment and the lower end of said casing is in the nature of a hopper.

4. The structure defined in claim 1 in which said casing is provided with a plurality of circumferentially-spaced carbide injector nozzles and a plurality of circumferentially-spaced fluid injector nozzles, one each of said fluid injector nozzles being coaxial with a cooperating air injector nozzle.

5. In a device of the class described, a plurality of vertically-disposed axially-aligned gasification casings, each of said casings having restricted axially-aligned connecting passages, the uppermost thereof being provided with an axially-aligned inlet and the lowermost thereof being provided with an axially-aligned outlet, a shaft extending axially through said casings and journalled for rotation therein, a plurality of raker plates carried by said shaft for rotation therewith, one each within each of said casings in vertically-spaced relation to the top walls thereof, annular open-topped material-receiving chambers in each of said casings concentric with said shaft, said raker plates adapted to receive material entering said casings through said inlets and depositing same in said annular open-topped chambers, said raker plates being spaced vertically from the inner walls of said annular chambers to provide a gas passage therebetween, a plurality of circumferentially-spaced air injector nozzles in the lower portion of each of said casings communicating with the lower end of said annular chambers and adapted to pick up carbide therefrom and project same angularly upwardly toward the axis of said casings, a plurality of circumferentially-spaced fluid injector nozzles in said casings adapted to project a spray of atomized fluid into said casings in the general direction of the carbide, and means in the uppermost of said connected casings for removing gas therefrom.

6. The structure defined in claim 5 in which said fluid injector nozzles are coaxial with and cooperate with one of said air injector nozzles.

7. The structure defined in claim 5 in which each of said casings is provided with a cylindrical side wall and a hopper-like bottom wall.

8. The structure defined in claim 5 in which said shaft is journalled within said aligned inlet, outlet, and connecting passages of the several casings.

FRIEDRICH OTT.

REFERENCES CITED

The following references are of record in the file of this patent:

UNITED STATES PATENTS

| Number | Name | Date |
|---|---|---|
| 2,278,521 | Kojola et al. | Apr. 7, 1942 |